United States Patent
Linsmeier

(10) Patent No.: US 8,393,040 B2
(45) Date of Patent: Mar. 12, 2013

(54) ANIMAL BEDDING REMOVAL APPARATUS

(75) Inventor: Richard Linsmeier, Menominee, MI (US)

(73) Assignee: Superior Attachments, Inc., Menominee, MI (US)

( * ) Notice: Subject to any disclaimer, the term of this patent is extended or adjusted under 35 U.S.C. 154(b) by 1160 days.

(21) Appl. No.: 12/059,586

(22) Filed: Mar. 31, 2008

(65) Prior Publication Data
US 2009/0241839 A1     Oct. 1, 2009

(51) Int. Cl.
*A01K 29/00*     (2006.01)
*B08B 9/38*     (2006.01)
(52) U.S. Cl. ............. 15/93.1; 172/23; 172/25; 56/367
(58) Field of Classification Search .............. 15/93.1; 119/28.5
See application file for complete search history.

(56) References Cited

U.S. PATENT DOCUMENTS

| | | | | |
|---|---|---|---|---|
| 2,713,479 A | * | 7/1955 | Wiebe | 299/68 |
| 3,017,008 A | * | 1/1962 | Olson | 241/246 |
| 3,721,214 A | * | 3/1973 | Staples et al. | 119/442 |
| 3,922,745 A | | 12/1975 | Lehman | |
| 4,163,302 A | | 8/1979 | Iaboni | |
| 4,202,160 A | | 5/1980 | van der Lely | |
| 4,245,457 A | | 1/1981 | Gerlinger | |
| 4,286,427 A | | 9/1981 | van der Lely | |
| 4,543,678 A | | 10/1985 | Cox | |
| 4,574,735 A | | 3/1986 | Hohenstein | |
| 4,621,487 A | | 11/1986 | Urlacher et al. | |
| 4,641,491 A | | 2/1987 | van der Lely et al. | |
| 4,693,065 A | | 9/1987 | Aron et al. | |
| 4,706,607 A | | 11/1987 | Ijichi | |
| 5,060,465 A | | 10/1991 | Jerome | |
| 5,163,277 A | | 11/1992 | Fransgaard | |
| 5,373,652 A | | 12/1994 | Olsson | |
| 5,464,066 A | | 11/1995 | Doucet | |
| 6,446,298 B1 | | 9/2002 | Berg | |
| 6,951,253 B1 | * | 10/2005 | Linsmeier | 172/25 |

FOREIGN PATENT DOCUMENTS

DE     19705426     8/1998

OTHER PUBLICATIONS

Dowdy's Sales and Service Rotary Conditioner, Web Page Advertisement, date unknown, www.dowdys.com/Tiller.htm.

* cited by examiner

*Primary Examiner* — Monica Carter
*Assistant Examiner* — Stephanie N Berry
(74) *Attorney, Agent, or Firm* — Nicholas A. Kees; Godfrey & Kahn, S.C.

(57) ABSTRACT

A bedding removal apparatus for removing bedding material in livestock free stalls is attached to a vehicle such as a skid steer. The bedding removal apparatus includes an auger configured to extend into the bedding of the free stall and draw the bedding toward a curb. The bedding removal apparatus includes a scraper engaging an inner end of the auger to remove bedding from the auger and deposit the bedding into the alley. The auger is mounted to a shaft which is positioned at an angle with respect to the curb and a movable frame to which the shaft is attached. The shaft may be angled down and forward with respect to the movable frame. A fixed frame is mounted to the vehicle and the movable frame is pivotably attached to the fixed frame. An actuator is configured to raise the movable arm from a position with the auger engaging the bedding to a raised position for movement or maneuvering of the vehicle.

18 Claims, 10 Drawing Sheets

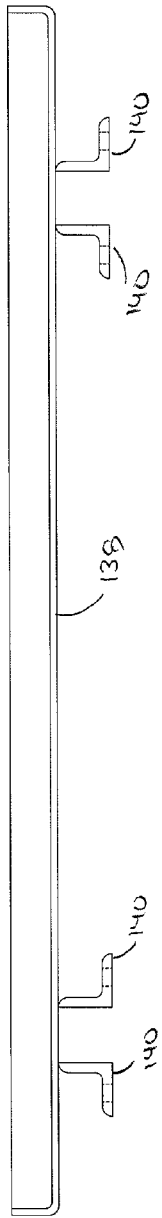
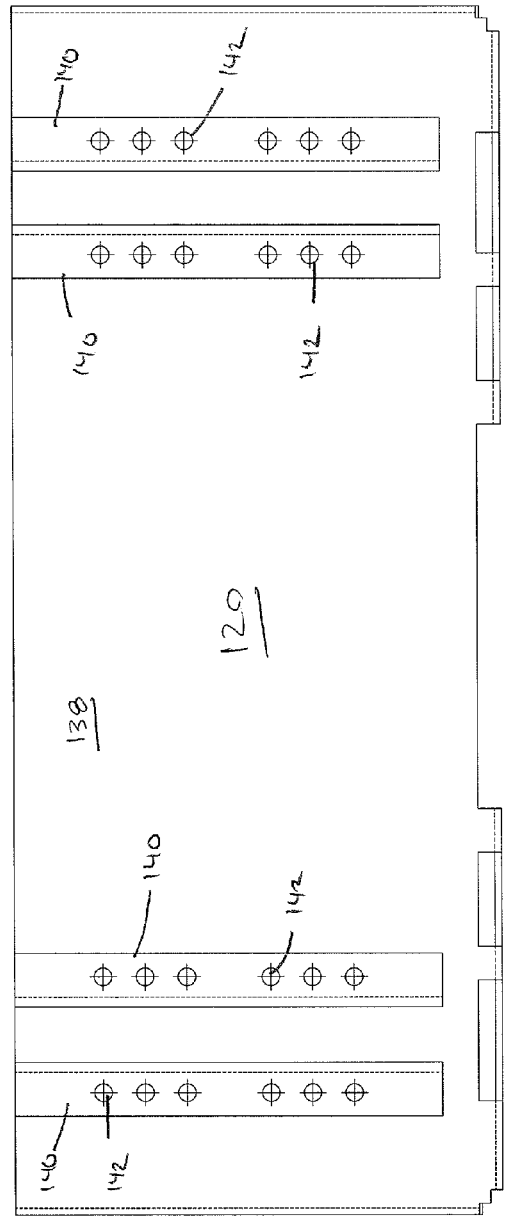
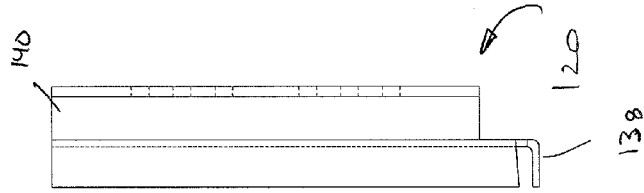

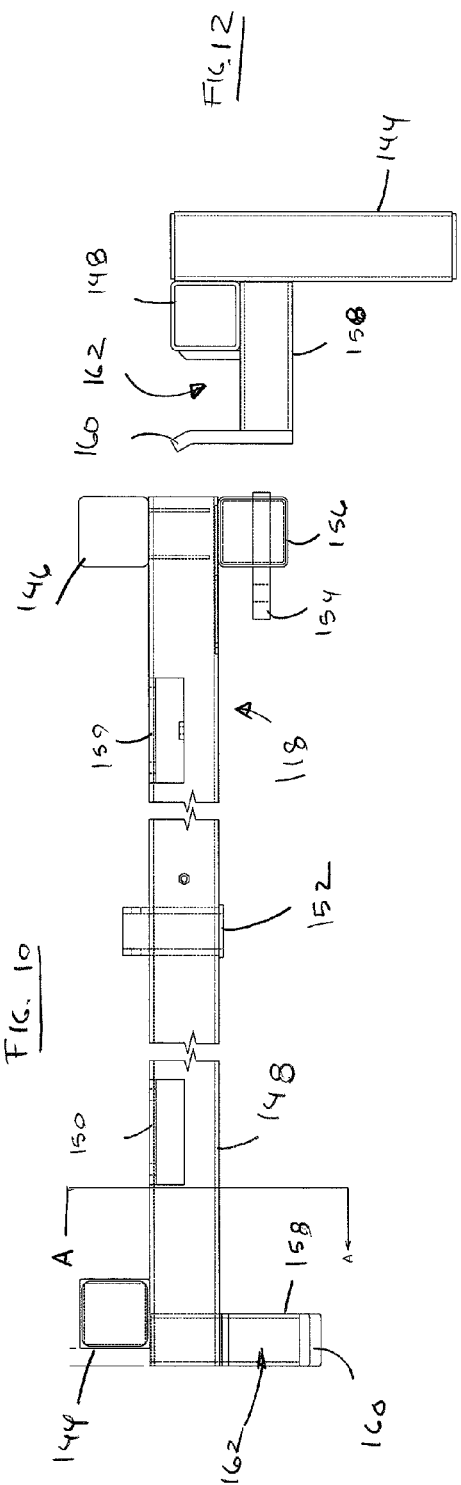
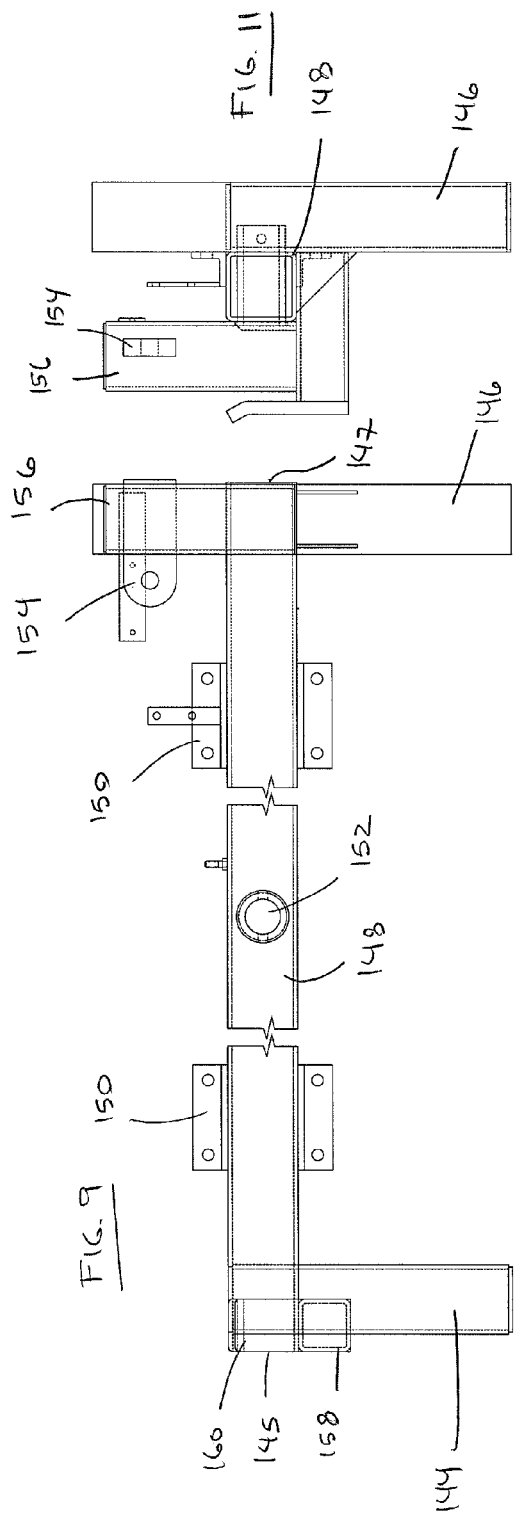

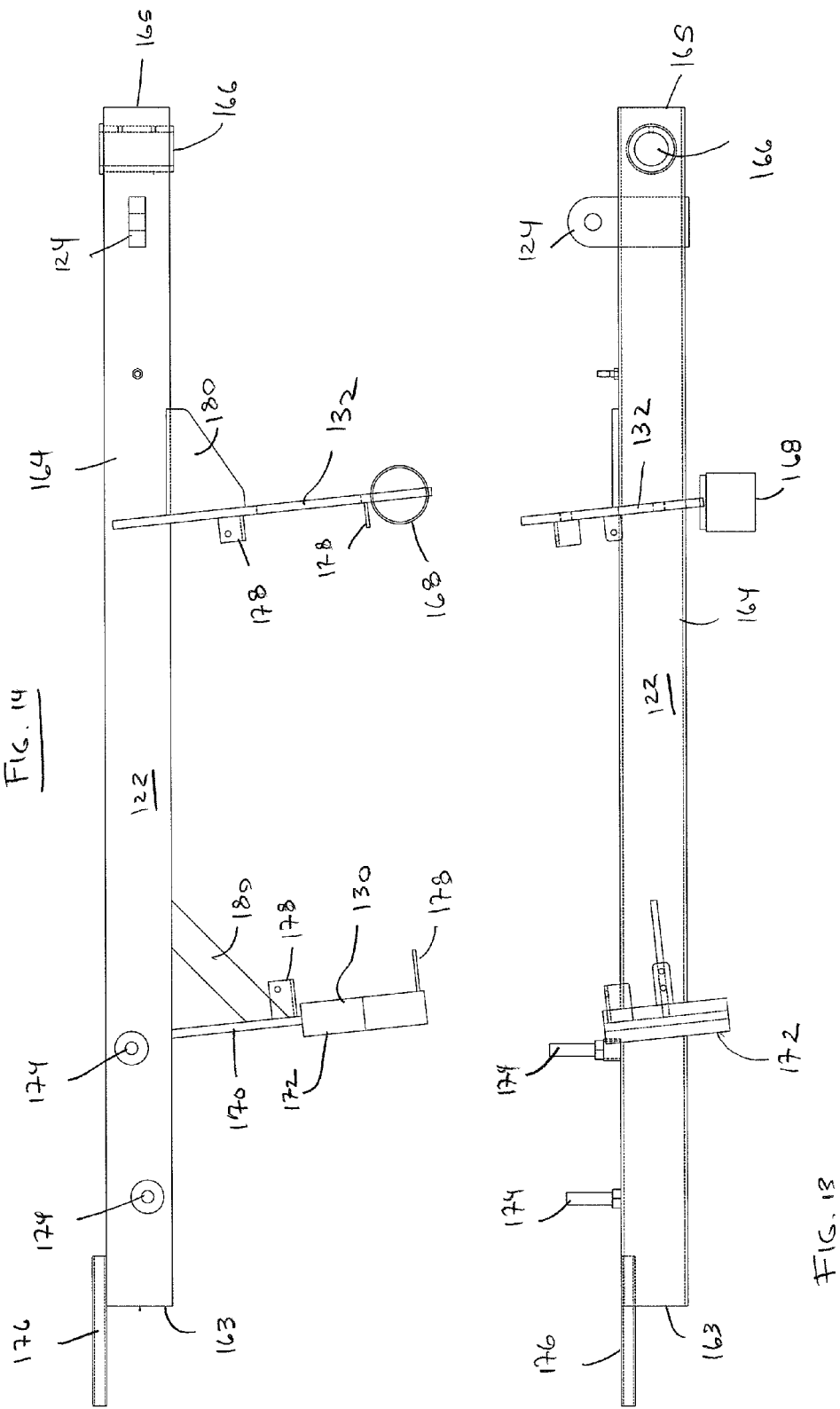

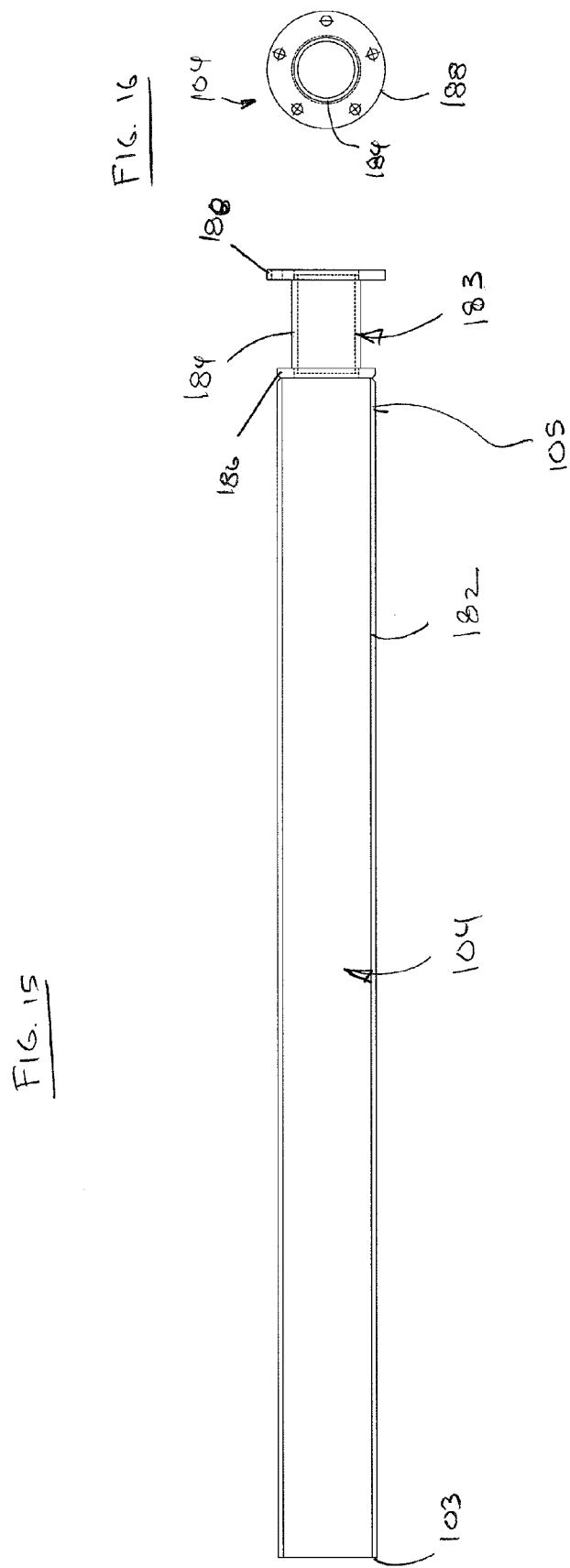

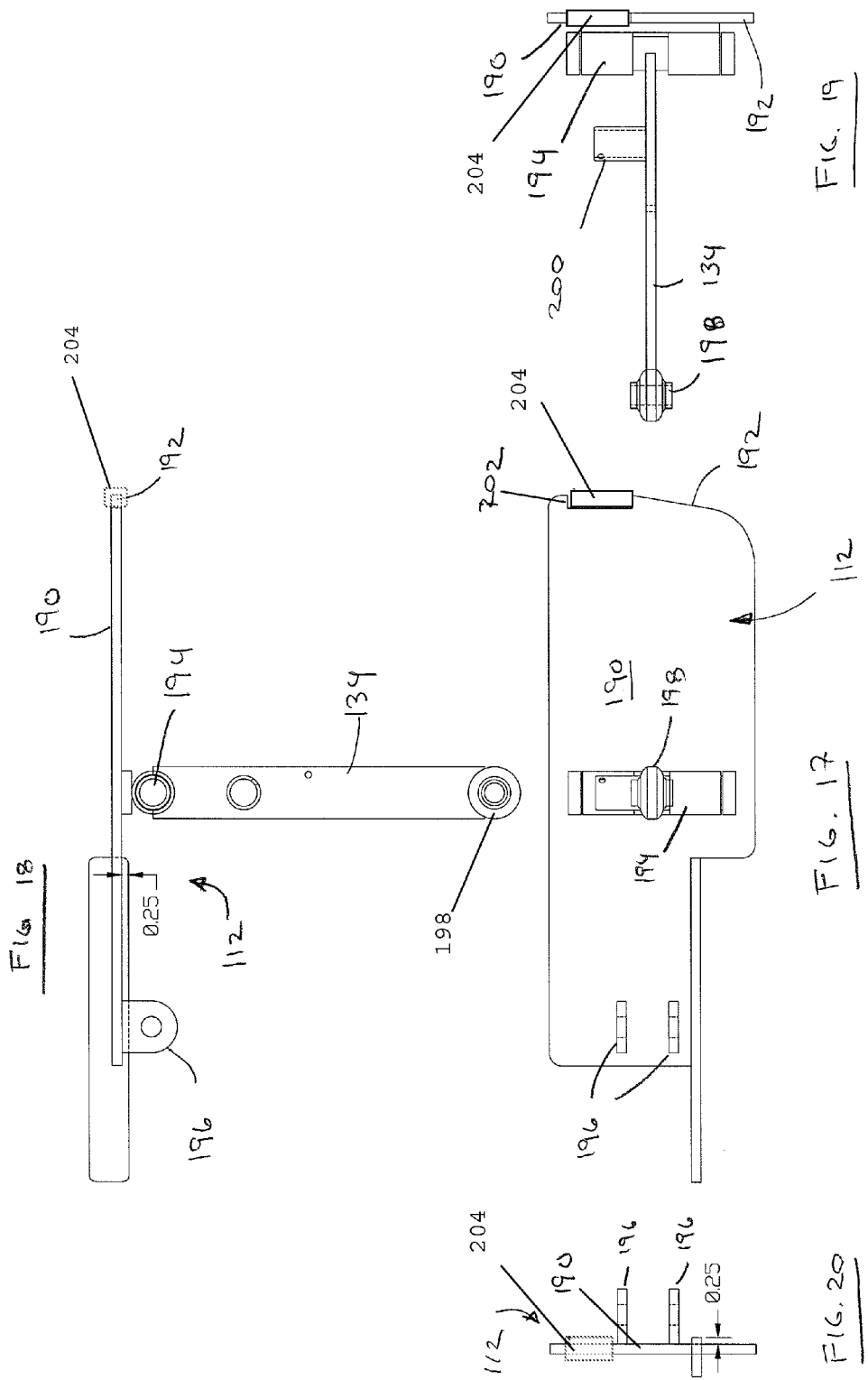

ANIMAL BEDDING REMOVAL APPARATUS

BACKGROUND

The present invention relates generally to animal farming, and more particularly to an apparatus for manipulating the bedding material in an animal stall.

In the larger animal farming operations today, animals are kept in stalls that are generally separated by railings. Cows in particular are kept in these types of stalls, commonly know as "free stalls." These stalls are arranged in large rows that are separated by alleys. At the rear of the stall is a relatively short curb, and at the front of the stall, a low wall known as a brisket board. Between the curb and the brisket board is a bedding material such as sand, ground rubber, ground nut shells, sawdust or the like.

After the animal has resided in a free stall for a period of time, the bedding tends get mashed down and arranged in a less than ideal fashion. For example, certain animals such as cows prefer that the bedding slope upward toward the brisket board. After a period of time, the bedding will become mostly horizontal, and some of it will have spilled over the curb. It is desirable to groom the bedding for several reasons. First, it introduces air into the bedding to dry it and retard growth of anaerobic bacteria. Second, it fluffs the bedding to make it more soft and comfortable. Finally, for animals that prefer a slope, the grooming process should make the bedding sloped in accordance with that preference.

An apparatus for grooming the bedding with free stalls was disclosed in commonly-owned U.S. Pat. No. 6,951,253, the disclosure of which is incorporated herein by reference. While such an apparatus is useful for prolonging the useful life of bedding, at some point in time the bedding within the stalls will need to be refreshed or replaced. Conventional methods of removing all or a portion of the bedding for replacement have required either a large amount of physical labor or required a machine that would need to be inserted within each stall of the free stall area individually. Such a mechanical process is quite time consuming and may subject the railings between stalls to inadvertent damage by the machine.

In addition, conventional approaches to lifting bedding material over the curb and into the alley for removal may result in damage to the curb or the bedding removal equipment.

Improvements to conventional approaches to the removal of bedding from free stalls or similar livestock housing arrangements are desirable.

SUMMARY

The present disclosure relates to an apparatus for removing animal bedding from free stalls. The apparatus may be mounted to a vehicle and movable from a generally horizontal position for removing bedding and a raised position for movement of the vehicle and apparatus within a barn or other enclosure. The apparatus includes an auger attached to an outer end of a shaft. Rotation of the shaft and auger draw bedding from the free stall toward a curb of the free stall. A scraper mounted to the apparatus engaged flighting of the auger, removes the bedding from the auger and deposits the removed bedding into an alley outside the curb for removal from the barn. The shaft may be angled forward and downward to facilitate removal of the bedding from the free stall and to minimize damage to railings between adjacent free stalls or to the curb.

Various other features, objects, and advantages of the disclosure will be made apparent to those skilled in the art from the following detailed description including illustrative examples setting forth how to make and use the invention.

BRIEF DESCRIPTION OF DRAWINGS

The accompanying drawing figures, which are incorporated in and constitute a part of the description, illustrate several aspects of the invention and together with the description, serve to explain the principles of the invention. A brief description of the figures is as follows:

FIG. 6 is a front view of an adapter plate of the bedding removal apparatus of FIG. 4.

FIG. 7 is a top view of the adapter plate of FIG. 6.

FIG. 8 is a side view of the adapter plate of FIG. 6.

FIG. 9 is a front view of a base frame of the bedding removal apparatus of FIG. 4.

FIG. 10 is a top view of the base frame of FIG. 9.

FIG. 11 is a side view of the base frame of FIG. 9.

FIG. 12 is a cross-sectional view of the base frame of FIG. 9, taken along line A-A of FIG. 10.

FIG. 13 is a front view of an extension boom of the bedding removal apparatus of FIG. 4.

FIG. 14 is a top view of the extension boom of FIG. 13.

FIG. 15 is a side view of rotary tube for driving the auger of the bedding removal apparatus of FIG. 4.

FIG. 16 is an end view of the rotary shaft of FIG. 15.

FIG. 17 is a front view of a flighting scraper assembly of the bedding removal apparatus of FIG. 4

FIG. 18 is a top view of the flighting scraper assembly of FIG. 17.

FIG. 19 is a first end view flighting scraper assembly of FIG. 17.

FIG. 20 is a second end view of the flighting scraper assembly of FIG. 17, with a link removed.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
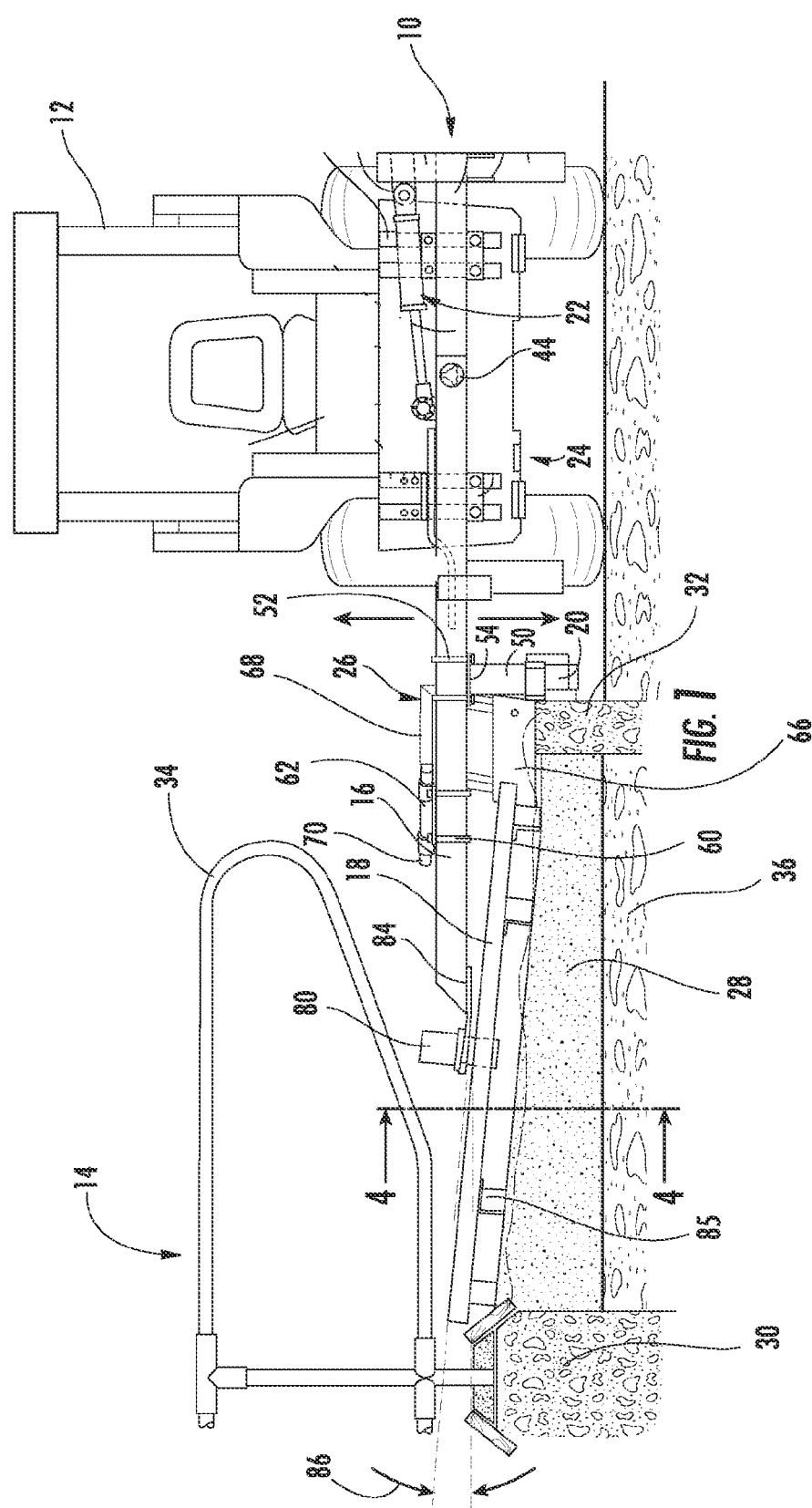
FIG. 1 is a front view of a prior art grooming apparatus, with a common mounting assembly in accordance with the present disclosure and mounted to a vehicle.
Figure 2:
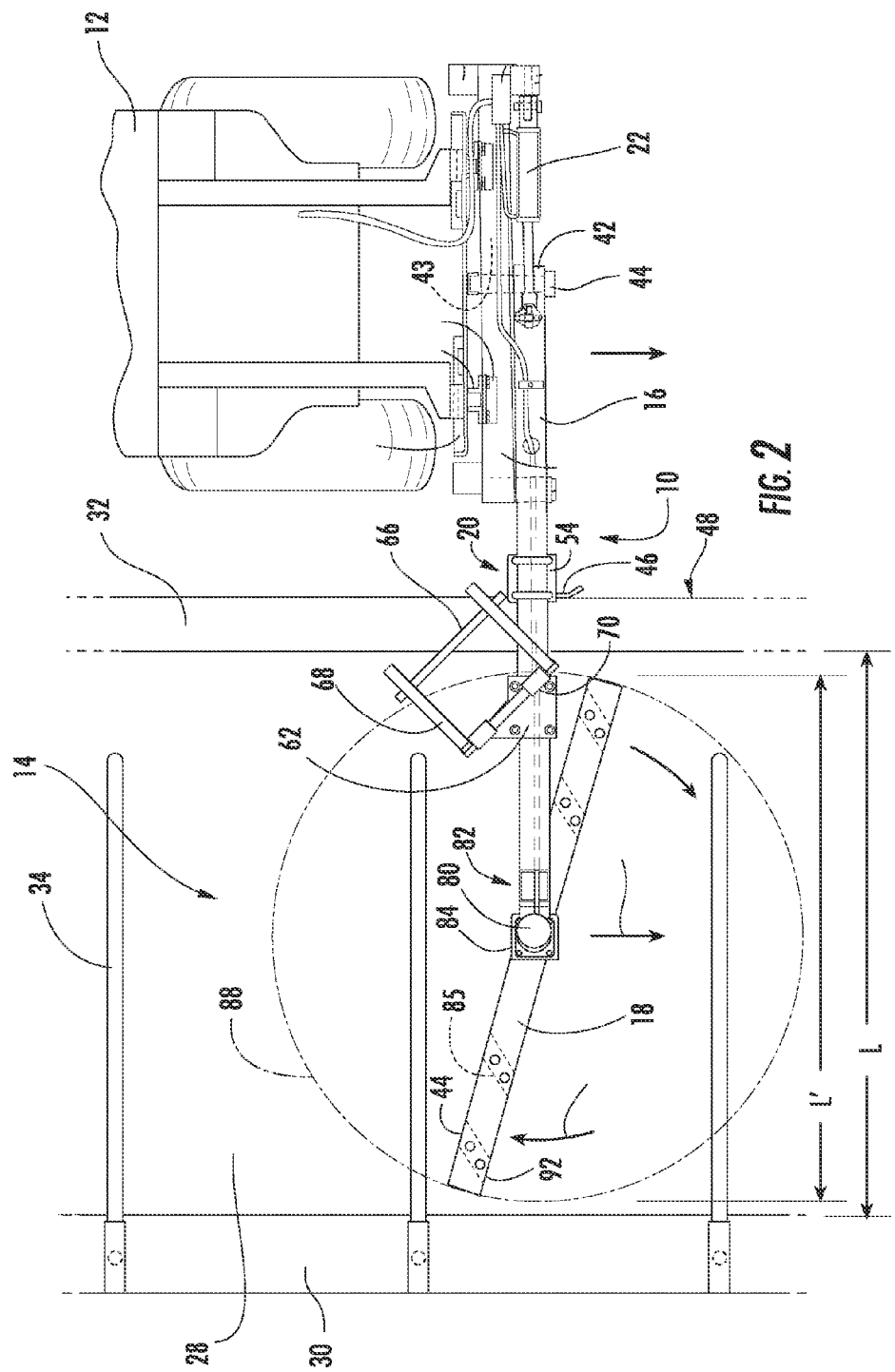
FIG. 2 is a top view of the prior art grooming apparatus of FIG. 1, further illustrating the common mounting arrangement to the vehicle.
Figure 3:
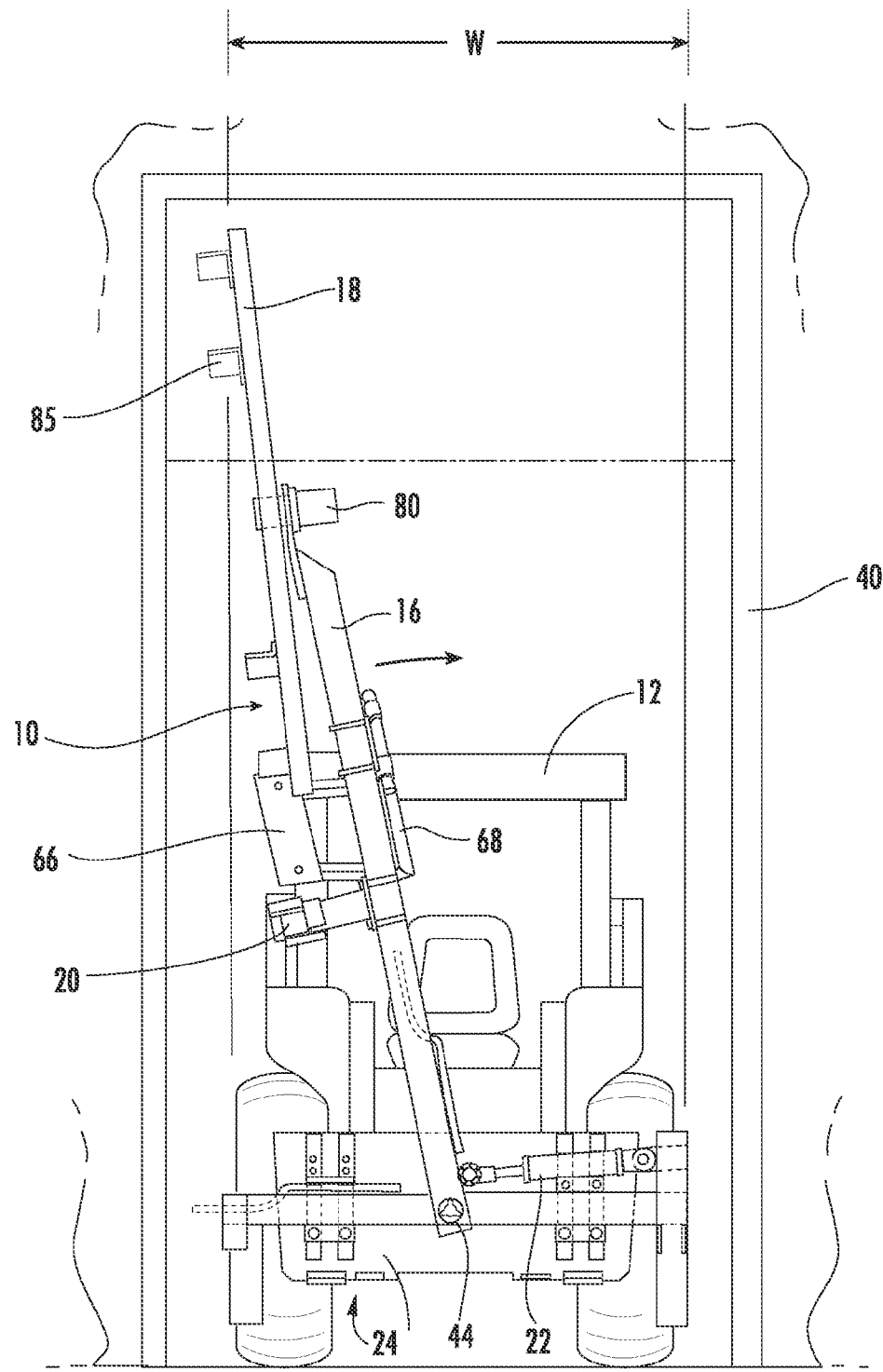
FIG. 3 is second front view of the prior art grooming apparatus of FIG. 1, further illustrating the common mounting arrangement and a tilting capability of such mounting arrangement to permit movement of the vehicle within a barn or other enclosure.

Referring now to FIGS. 1 to 3, a prior art animal stall groomer 10, which may be selectively or permanently attached to a vehicle 12, and making contact with bedding 28 contained in a row of free stalls 14. Generally, the groomer 10 apparatus is constructed from a boom 16, a rotary arm 18, a curb guide 20, and a lifting actuator 22. The groomer 10 is attached to the vehicle 12, such as a skid steer or the like, with an adaptor assembly 24. A scraper assembly 26 may be attached to the boom 16 for scraping bedding material 28 back into the free stalls 14.

Free stalls 14 are the type of animal stalls typically used in the dairy industry. Free stalls 14 are arranged in long rows defined by a brisket board 30 at the head end in generally parallel relation to a curb 32 at the tail end, and the stalls are separated from each other by railings 34. The brisket board 30 may be a low wall that will generally be taller than the curb. The livestock in the stalls, such as cows, are separated from one another by the railings 34. Though there are footings located underneath the curb 32 and brisket board 30, there is generally only a dirt floor 36, that is, soil, underneath the bedding 28, for drainage purposes. The bedding 28 generally fills the volume between the curb 32 and brisket board 30, above the floor 36. The bedding 28 is either sand, ground rubber, ground nut shells, sawdust or the like, or even straw. Some of these materials absorb moisture more readily than others, and some pack down more solidly than others. However, it is desirable to aerate and fluff any type of bedding material to keep it sanitary and comfortable.

In FIGS. 1 and 2, groomer 10 is shown in a working position. In contrast, FIG. 3 shows groomer 10 in a stowed or raised position. Preferably actuator 22 is retracted to raise the boom 16 along with rotary arm 18 so that groomer 10 does not extend significantly beyond the width "W" of vehicle 12. This allows the vehicle 12 to fit through relatively narrow passages such as a barn door 40 or between rows of free stalls 14.

As indicated above, the invention contemplates that the groomer 10 may be attached to any suitable vehicle having the ability to raise and lower, and possibly even rotate, an accessory, and in addition having an auxiliary hydraulic circuit. Examples of such a vehicle includes a farm tractor, or even have a vehicle dedicated to the use of the groomer 10, and it is most preferable to attach groomer 10 to a vehicle commonly called a skid steer 12. Conventional skid steers are capable of having various attachments connected thereto, such as buckets and plow blades, and further have the capability of rotating such attachments about an axis that is parallel to the front wheel axis of the skid steer 12, as contrasted to the rotation that can be seen by comparing FIGS. 1 and 3. Thus, when groomer 10 is attached to a skid-steer or equivalent vehicle, the boom 16 can be rotated forward from a substantially vertical position shown in FIG. 3, to a substantially horizontal position extending outwardly from the front of the skid steer. Using this same capability, with the boom 16 in the generally horizontal operating position shown in FIGS. 1 and 2, the skid steer 12 can adjust the pitch of the rotary arm 18 as described herein.

Figure 4:
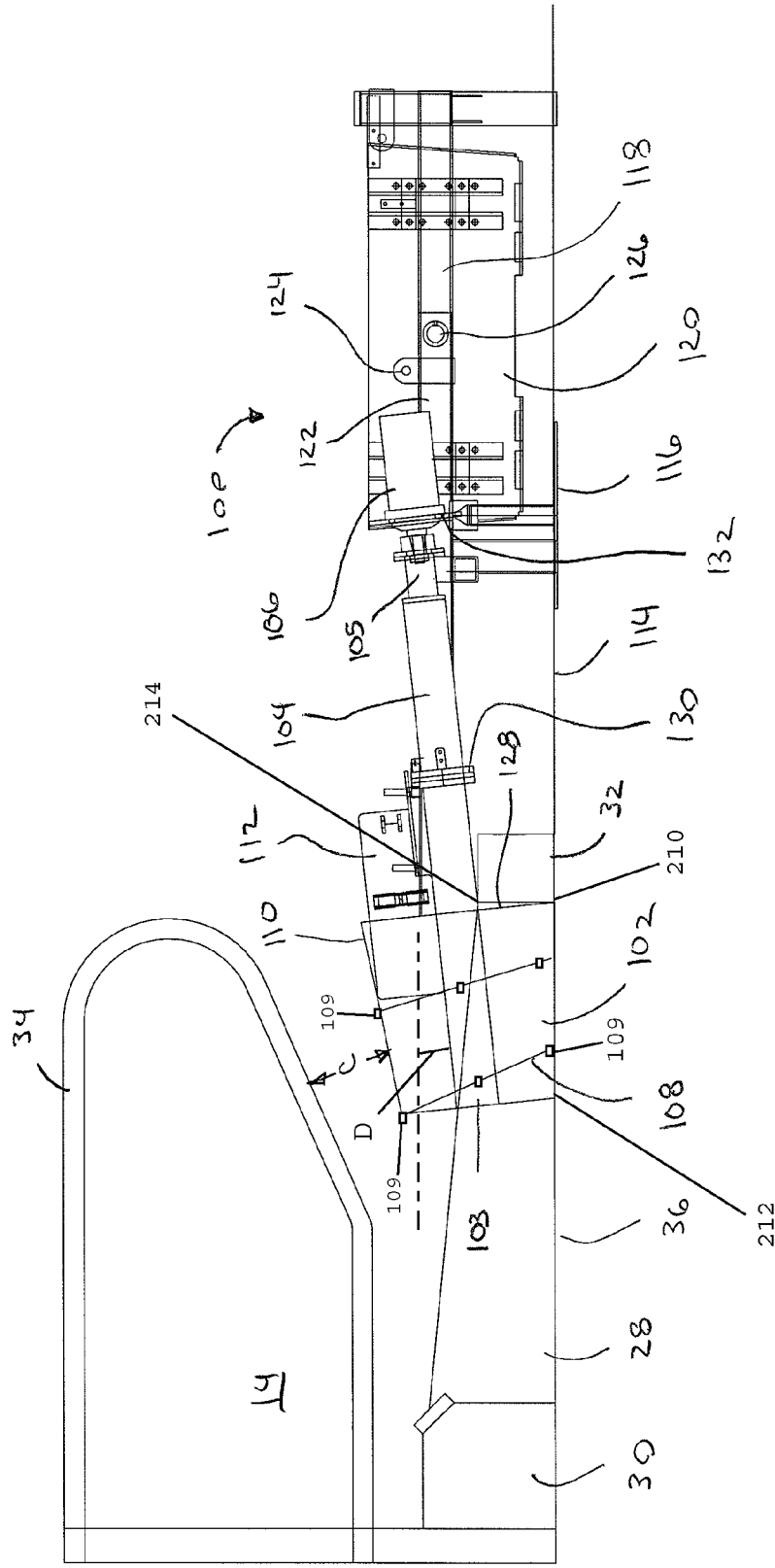
FIG. 4 is a front view of a bedding removal apparatus for mounting to the vehicle of FIG. 1 according to the present invention, shown in cross-section with bedding removal auger positioned within a stall.
Figure 5:
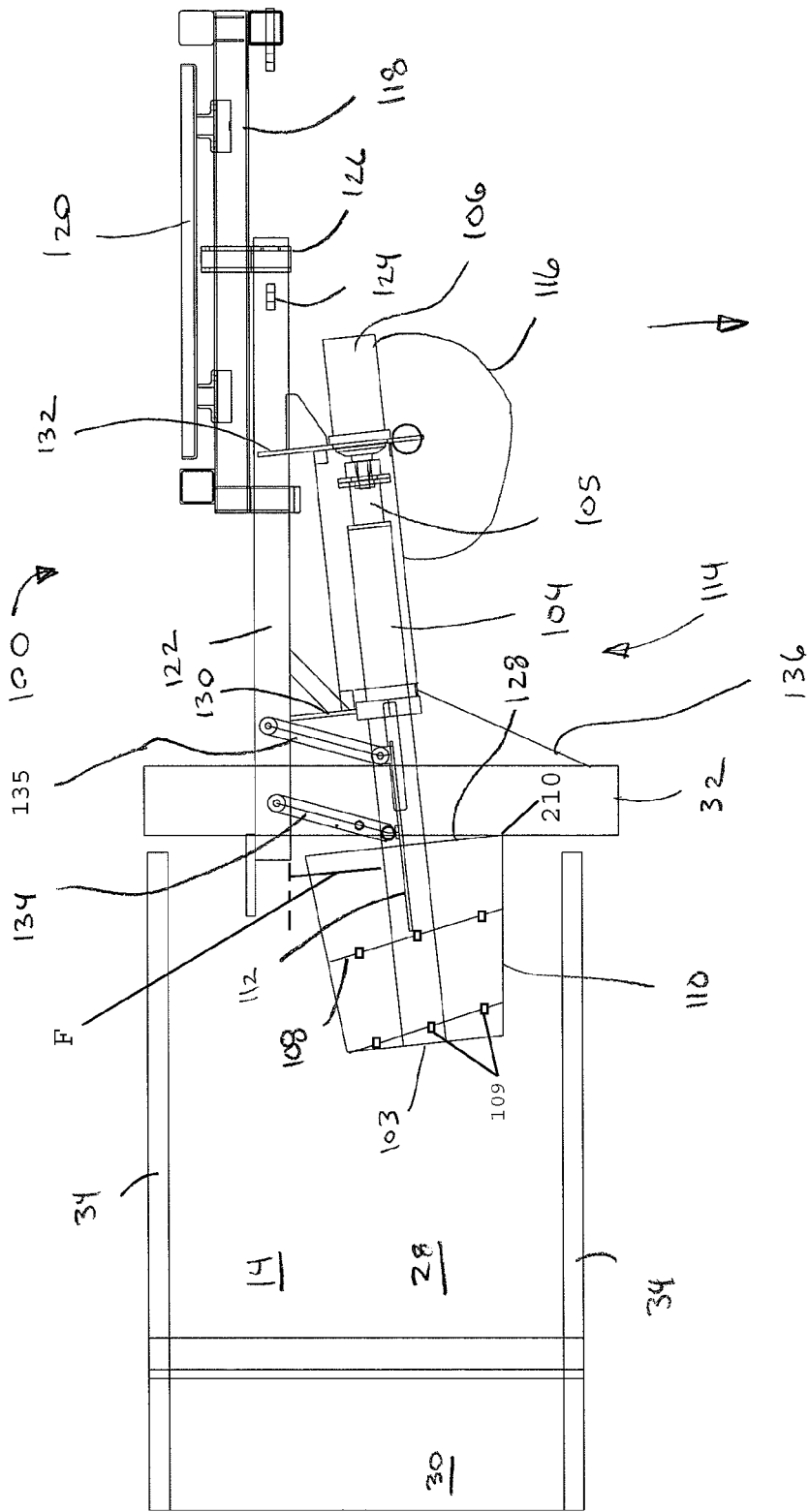
FIG. 5 is a top view of the bedding removal apparatus of FIG. 4.

Referring now to FIGS. 4 and 5, a bedding removal apparatus 100 is shown in position to remove bedding 28 from stall 14 adjacent curb 32. Apparatus 100 includes an auger 102 mounted at an outboard end 103 of a rotary shaft 104 which may be driven by a motor, such as hydraulic motor 106 mounted at an inboard end 105 of shaft 104. Auger 102 includes one or more flights 108 positioned in a general spiral or helical fashion about shaft 104. Flights 108 cooperate to define a cone 110 from which bedding may be removed when shaft 104 is rotated. Adjacent an inboard end 128 of flights 108 is a movable flighting scraper 112 which aids the removal of bedding material 28 from auger 108 to deposit in the alley 114 beyond curb 32.

As described in U.S. Pat. No. 6,951,253, motor 106 may preferably operate with pressurized hydraulic fluid from vehicle 12. The amount of flow required to operate motor 106 will vary based on the amount and weight of bedding to be moved and the length and width of the auger, among other variables. It is currently that a direct drive motor may be used, as shown, or that a gearbox or transmission linkage may be placed between the motor and the shaft to permit a higher speed motor to be used while maintaining the desired rotational speed of auger 102. Motors which operate at higher rotational speeds may be more efficient or desired for other reasons and thus direct drive motors and geared motors are specifically within the scope of the present disclosure.

As shown in FIG. 4, apparatus 100 is positioned to begin removal of bedding for illustrative purposes. Apparatus 100 is shown supported by a parking stand 116 and a pair of legs extending from a fixed frame assembly 118. In actual operation, in accordance with the present disclosure, apparatus 100 would be attached to vehicle 12 as shown in the FIGS. above. FIGS. 4 and 5 both show apparatus 100 placed on parking stand 116 in the interest of clarity. Apparatus 100 would not be operated with parking stand 116 in place. Frame assembly 118 is shown mounted to an adapter plate 120 which permits the interface between apparatus 100 and vehicle 12 or any other suitable vehicle to be adjusted as needed to mount and operate apparatus 100 as described herein. Pivotably mounted to frame assembly 118 is a movable frame 122. A pivot pin 126 defining a pivot point and an attachment point 124 for connection to an actuator such as 22, shown above, permit apparatus 100 to be pivoted upward similar to the bedding grooming device of FIG. 3.

Shaft 104 is rotatably mounted to movable frame 122 by a bearing support 130 positioned in an intermediate position along the shaft and a motor mount 132 to which motor 106 is attached. Bearing support 130 and motor mount 132 serve to secure shaft 104 at a desired position to operate auger 102 and remove bedding from stalls 14 while also permitting the auger and shaft to be raised for movement and transport. A pair of pivoting links 134 mount flighting scraper 112 movably to frame 122 and the scraper is preferably biased, such as by a spring, to rest against flighting 108 as the flighting rotates with shaft 104.

As shown in FIGS. 4 and 5, auger 102 may preferably be positioned within stall 14 adjacent curb 32. To ensure efficient removal of bedding 28 into alley 114, auger 102 may be positioned as close to curb 32 as possible. As shown, auger 102 is configured to rotate clockwise when viewed from motor 106 along shaft 104. Bedding 28 engaged by auger 102 will then tend to be moved toward curb 32 and carried over a top side of shaft 104 where scraper 112 engages the bedding, removes it from the auger and directs it toward alley 114.

As auger 102 is advanced forward (as shown by the arrow in FIG. 5), inboard end 128 is preferably in contact with curb 32 within stall 14. The orientation of the flighting 108 and rotation of shaft 104 prevents or reduces damage to curb 32 by auger 102. To further reduce damage to curb 32, and to enhance removal of bedding 28 from stall 14, shaft 104 may be positioned at an angle with respect to horizontal and vertical. Such angling my provide several advantages. First, it reduces the extent to which inboard end 128 of flighting 108 actually contacts curb 32. Second, as shown in FIG. 4, it permits inboard end 128 to reach into the corner within stall 14 defined by curb 32 and floor 36. Third, angling shaft 104 downwardly and forming cone 110 as a tapered conical shape so that a lower portion of cone 110 is parallel to floor 36, then additional clearance C under railings 34 can be achieved (as compared to a flighting defining a straight walled cylinder and mounted to a horizontal shaft). This reduces the chance of damaging tailings 34 when removing bedding from stalls 14. The range of angles found to most effective for operation of auger 102 are from 3 degrees to 10 degrees, preferably 6 degrees, for the downward angle of shaft 104 from horizontal or from frame 122 which is typically oriented horizontally (shown as Angle D in FIG. 4), and from 3 degrees to 10 degrees, preferably 6 degrees, for the forward angle of shaft 104 with respect to perpendicular from curb 34 or to movable frame 122, which will be generally oriented perpendicular to curb 34 in operation (shown as Angle F in FIG. 5).

It is anticipated that the length of cone 110 and of shaft 104 may be altered to be relatively greater or less than the length shown in the FIGS., and adjusted as needed to a particular operational environment. For stalls 14 which have different dimensions than those shown herein, the size and length of portions of the illustrated embodiment may be altered as needed for efficient and safe operation. The angles for the downward and forward pitch or angling of shaft 104 should also be altered to accommodate the changes in taper or length of auger 102. The 6 degree angles shown are configured to cooperate with the tapered cone 110 to provide a flat bottom 212 of cone 110 along floor 36, while preferably engaging a lower corner 210 of curb 32. The angling of inboard end 128 allows flighting 108 to clear or not impact upper corner 214 of curb 34. Greater or smaller diameters of auger 102 may be provided to work with curbs such as curb 34 which differ in height from that shown in FIG. 4.

It is anticipated that flighting 108 may be smooth along an outer edge or may have one or more tips or bits 109 mounted along the outer edge. Such bits may provide greater resistance to wear (being made of a harder or more durable material then the flighting) or may provide greater efficiency in extracting material by breaking up hardened, or clumped bedding.

A curb guide 136 may be added to bedding removal apparatus 100 to permit the operator of vehicle 12 to have a gauge as the position of auger 102 when removing bedding.

Referring now to FIGS. 6 to 8, adapter plate 120 is shown with a panel 138 to which may be mounted a plurality of brackets 140 for connecting to main frame 118. Brackets 140 each provide a plurality of openings 142 to permit some flexibility in mounting frame 118 in a position best suited to the vehicle operating the bedding removal apparatus and the particular configuration of the stalls or bedding.

Referring now to FIGS. 9 to 12, frame 118 is shown with a first leg 144 and a second leg 146 which cooperate with parking stand 116 (shown in FIGS. 4 and 5, above) to permit apparatus 100 to stand upright when disconnected from vehicle 12. A central frame member 148 extends between the legs and includes a pair of mounting brackets 150. Mounting brackets 150 are spaced apart and positioned to be attached to brackets 140 of adapter plate 120. Positioned along member 148 between brackets 150 is a pivot pin opening 152. Pivot pin opening 152 permits pivot pin 126 to be extended through frame 118 and movable frame 122 so that movable frame 122 is pivotably mounted to frame 118. At a first end 147 of member 148 adjacent second leg 146 may be mounted a hydraulic actuator support 154 extending through a vertical member 156 to position actuator 22 to move movable frame 122 between an upright transportation position and a lowered operational position. The configuration of the various elements of frame 118 or other assemblies or subassemblies described below is shown merely for illustrative purposes. Members, legs, braces, plates, etc., which may be shown as square tubing or round stock may be made from tubing or stock of other shapes or configurations provided these elements perform the same function as that described herein.

At an opposite end 145 of member 148, adjacent first leg 144 may be a horizontal extension 158 with an outer bracket 160 extending upward at a distal end. Extension 158, member 148 and bracket 160 cooperate to define a space 162 to receive movable frame 122 when in the lowered position. Space 162 may be configured to provide additional lateral support for frame 122 when auger 102 is operating, releaving some stress on pivot 152 and the pivot pin by reducing deflection of the movable frame. Space 162 may also provide a lower limit stop for movable frame 122, to aid in the positioning of auger 102 at the desired angle below horizontal, as described above.

Referring now to FIGS. 13 and 14, movable frame 122 includes a main channel 164 with a inner end 165 and an outer end 163. Adjacent inner end 165 are pivot pin opening 166 for receiving pivot pin 126 to pivotably mount frame 122 to frame 118. Attachment 124 is provided for actuator 22. Adjacent second end 163 are a pair of pivot mounts 174 to receive ends of links attached to flighting scraper 112. Note that as flighting scraper 112 is tilted downward at an angle similar to that of shaft 104 with respect to frame 122, inner pivot mount 174 is positioned higher than outer pivot mount 174. This difference in mounting height for the ends of the scraper links is chosen sp angle the scraper correctly to engage flighting 108. The pivot mounts are also mounted at different distance front to back on channel 164 to place the scraper at the desired offset angle as well. Mounted to outer end 163 may also be a sprint mount 176, positioned to receive one end of a spring or other resilient member attached to scraper 112, to hold scraper 112 in contact with flighting 108.

Mounted to frame 122 between the inner and outer ends are motor mount 132 and shaft bearing mount 130. As can be seen in FIG. 13, these elements are also angled downward to mount shaft 104 at the desired offset angles, both angling down and angling toward the front. Motor mount 132 includes an opening to mount motor 106 when connected to shaft 104. Motor mount 132 may also include a parking stand receiver 168. Shaft bearing mount 130 may be made of a bracket 170 and a shaft bearing 172 for rotatably receiving shaft 104. Additional mounting tabs 178 and gussets 180 may be provided for mounted additional braces or equipment, or to stabilize the bearing support and motor mount.

FIGS. 15 and 16 show shaft 104 with a main shaft tube 182 and a hub assembly 183 mounted at end 105, hub assembly 183 including an inner plate 186, an outer plate 188 and a central tube 184 extending therebetween. Hub assembly 183 provides a proper sized mounting flange or face in outer plate 188 to connect to motor 106. If a different motor were used, or a geared transmission or other assembly were placed between shaft 104 and the motor, then hub assembly 183 may be adapted to permit this altered drive arrangement to be utilized without changing tube 182 or auger 102.

Referring now to FIGS. 17 to 20, flighting scraper 112 includes a scraper plate 190 with a pivoting mounting arrangement 194 for first link 134. A second mounting location defined by tabs 196 is provided to attach second link 135 for movable mounting scraper 112 to movable frame 122. Pivot mount 194 is configured to permit link 134 to only move perpendicular to plate 190. As shown, tabs 196 are provided to permit a more flexible mounting of link 135, such as by a spherical bushing or ball mount 198 shown on an opposite end of link 134 from pivot mount 194. Alternatively, both links 134 and 135 may be mounted to plate 190 with a pivot mount 194. Links 134 and 135 preferably both include an end 198 opposite the mounting to plate 190 in which may be received one of the pivot mounts 174. Mount arrangements 194 and 196 may both be configured to permit pivoting of links 134 to permit movement of scraper 112 longitudinally along frame 122 generally parallel to shaft 104 but resisting movement along other axes so that scraper 112 remains properly positioned along the top of shaft 104.

Plate 190 includes a scraper end 192 which interacts with flighting 108 to remove bedding from auger 102 and direct the removed bedding into the alley. Link 134 shown may include a spring connection point 200 for attaching a spring or other resilient member to provide biasing of scraper end 192 against flighting 108. The resilient member will permit scraper 112 to ride along with flighting 108 as the spiral shape moves scraper 112 toward the alley until an inner most end of the flighting passes beyond scraper end 192. The member will then reposition the scraper end against the flighting. A rigidly positioned scraper would not permit this interaction between flighting and scraper and would only be positioned to remove bedding from the auger when the inner most end of the flighting passes the fixed scraper. A recess 202 may be provided in scraper end 192 to permit the mounting of a hardened or sacrificial insert 204 that would ride against flighting 108. Such as wear piece as insert 204 my be replaced as needed without the need to remove or replace the entire scraper 112.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. An apparatus for removing bedding material in an animal free stall, the animal free stall having a stall rail separating it from an adjacent animal free stall, the apparatus comprising:
   a fixed frame adapted for connection to a vehicle, and having a first end a second end;
   a movable frame pivotably attached to the fixed frame and extending generally horizontally to a surface on which the vehicle is positioned;
   a shaft rotatably mounted to the movable frame, with helical flighting mounted to an outer end of the shaft defining an auger, the auger configured to draw bedding material from adjacent an outer end of the auger toward an inner end of the auger, the shaft tilted downward from the inner end toward the outer end with respect to the surface on which the vehicle is positioned, the auger configured to be positioned with both the inner and outer ends within the animal free stall;
   a motor for selectively rotating the auger;
   a scraper movably mounted to the movable frame and positioned with a scraper end engaging the flighting of the auger adjacent an inner end of the auger to remove bedding material from the auger and direct the bedding material from the animal free stall.

2. The apparatus of claim 1, further comprising the movable frame configured to mount the shaft tilted forward away from the fixed frame.

3. The apparatus of claim 2 further comprising an adapter plate configured for attachment to the vehicle, the adapter plate including at least one bracket, the fixed frame including at least one corresponding mounting bracket, and the fixed frame mounted to the adapter plate.

4. The apparatus of claim 3 further including an actuator connected between the fixed frame and the movable frame so that when the actuator is retracted, the movable frame and auger are raised.

5. The apparatus of claim 4 wherein the motor and the actuator are operated hydraulically.

6. The apparatus of claim 1 wherein the vehicle comprises a skid steer.

7. The apparatus of claim 1 wherein a downward angle of the rotary shaft is 6 degrees.

8. The apparatus of claim 2, wherein the forward angle of the rotary shaft is 6 degrees.

9. An apparatus for removing bedding material from free stalls in a barn, the free stalls having a curb adjacent an alley in the barn, the alley sized to permit a vehicle to travel adjacent the free stalls, the apparatus comprising:
   a movable frame having a proximal end and a distal end, the movable frame mounted to the vehicle and extending generally horizontally from the vehicle;
   an auger mounted to an outer end of a shaft rotatably mounted to the movable frame, the shaft extending downward with respect to the movable arm, the auger having an inner end positioned adjacent the outer end of the shaft, and, an outer end opposite the inner end, and the auger further having flighting positioned between the inner and outer ends, and configured to draw bedding material from the free stall toward the curb;
   a motor connected to the shaft and configured to rotate the shaft;
   a scraper mounted to be movable with respect to the movable frame, the scraper having a scraping end in engagement with the flighting of the auger and remove bedding from the auger and position the removed bedding within the alley.

10. The apparatus of claim 9, further comprising the shaft extending at an angle forwarding from the movable frame away from the vehicle.

11. The apparatus of claim 9, further comprising a fixed frame mounted to the vehicle with the movable frame pivotally mounted to the fixed frame with a pivot pin, with an actuator connected to both the fixed and movable frames, the actuator configured to pivot the movable frame about the pivot pin.

12. The apparatus of claim 11, the fixed frame further comprising a space for receiving the movable frame to position the auger within the free stall to remove bedding, the space configured to provide fore and aft support to the movable arm while permitting the actuator to pivot the movable arm upward away from the free stall.

13. The apparatus of claim 9, further comprising the downward angle of the shaft is approximately 6 degrees.

14. The apparatus of claim 10, wherein the forward angle of the shaft is approximately 6 degrees.

15. The apparatus of claim 11, further including the actuator connected between the fixed and movable frames so that when the actuator is retracted, the movable frame is raised.

16. The apparatus of claim 15, wherein the motor and the actuator are hydraulically controlled from a single source of hydraulic fluid.

17. The apparatus of claim 9 wherein the scraper engages with the slighting at the inner end of the auger.

18. The apparatus of claim 17 wherein the movement of the scraper with respect to the movable frame is a reciprocating motion as the scraping end follows the inner end of the auger.

* * * * *

UNITED STATES PATENT AND TRADEMARK OFFICE
CERTIFICATE OF CORRECTION

PATENT NO. : 8,393,040 B2  
APPLICATION NO. : 12/059586  
DATED : March 12, 2013  
INVENTOR(S) : Linsmeier Page 1 of 1

It is certified that error appears in the above-identified patent and that said Letters Patent is hereby corrected as shown below:

In the Claims

Column 7
Line 32, the word --and-- should preceed the word "a"

Column 8
Line 57, the word --flighting-- should replace the word "slighting"

Signed and Sealed this  
Fourteenth Day of May, 2013

Teresa Stanek Rea  
*Acting Director of the United States Patent and Trademark Office*